United States Patent [19]

Kitajima

[11] 4,168,905

[45] Sep. 25, 1979

[54] VARIABLE MAGNIFICATION COPYING APPARATUS

[75] Inventor: Tadayuki Kitajima, Yokohama, Japan

[73] Assignee: Canon Kabushiki Kaisha, Tokyo, Japan

[21] Appl. No.: 859,254

[22] Filed: Dec. 9, 1977

[30] Foreign Application Priority Data

Dec. 14, 1976 [JP] Japan ........................ 51-150216

[51] Int. Cl.² ..................... G03B 27/70; G03B 15/28

[52] U.S. Cl. ..................................... 355/60; 355/8

[58] Field of Search ................ 355/60, 57, 66, 8, 11, 355/51, 55, 56

[56] References Cited

U.S. PATENT DOCUMENTS

| | | | |
|---|---|---|---|
| 3,614,222 | 10/1971 | Post et al. | 355/60 X |
| 3,884,574 | 5/1975 | Doi et al. | 355/8 X |
| 3,914,044 | 10/1975 | Ogawa | 355/8 |
| 3,918,806 | 11/1975 | Cook | 355/8 |
| 3,990,792 | 11/1976 | Kono et al. | 355/8 |
| 4,073,584 | 2/1978 | Kitajima | 355/8 |

FOREIGN PATENT DOCUMENTS

| | | | |
|---|---|---|---|
| 51-34731 | 9/1976 | Japan | 355/60 |

*Primary Examiner*—L. T. Hix
*Assistant Examiner*—W. J. Brady
*Attorney, Agent, or Firm*—Fitzpatrick, Cella, Harper & Scinto

[57] ABSTRACT

This specification discloses a copying apparatus in which a first and a second reflector are movable at a velocity ratio of 1:½ to scan an image original and the first reflector is displaced by magnification change operation. A movable pulley is provided to a support member for the second reflector. A wire having one end secured in place within the apparatus is passed over the movable pulley and the other end portion thereof is wound on a drive pulley. A support member for the first reflector is secured to the wire between the movable pulley and the drive pulley. The wire is passed over a first pulley displaceable by magnification change operation, between that end of the wire secured in place and the securing point of the wire to the first reflector supporting member. The wire is also passed over a second pulley displaceable by magnification change operation, between the securing point of the wire to the first reflector supporting member and the drive pulley. The first and second pulleys are integrally displaceable.

30 Claims, 13 Drawing Figures

VARIABLE MAGNIFICATION COPYING APPARATUS

BACKGROUND OF THE INVENTION

This invention relates to a variable magnification copying apparatus, and more particularly to such a copying apparatus which is provided with first and second reflector means movable at a velocity ratio of 1:½ to scan an image original to be copied.

A copying apparatus in which first and second reflector means movable at a velocity ratio of 1:½ optically scan an image original to be copied and the optical image of the original is projected on a movable photosensitive medium in the fashion of so-called slit-exposure is known in the art. The first and second reflector means are moved at the velocity ratio of 1:½ for the purpose of maintaining a predetermined length of the optical path between a focusing lens and the original during the scanning period.

On the other hand, if the length of the optical path between the principal plane of the focusing lens and the original is a, the length of the optical path between the principal plane of the focusing lens and the photosensitive medium at the exposure station is b and the focal length of the focusing lens is f, and when there is established a relation that $1/a+1/b=1/f$, then an optical image at magnification m of the original is formed on the photosensitive medium. Here, $m=b/a$. By using m and f, a and b may be expressed as: $a=(m+1)f/m$ and $b=(m+1)f$. Also, $a+b=(m+1)^2f/m$.

As can be seen from the foregoing, the lengths of optical paths a, b and (a+b) must be varied when copy magnification is changed. For example, when copy magnification is changed from m to $m_c$, the lengths of optical paths a, b and (a+b) must be changed to a+Δa, b+Δb, and (a+b)+Δ(a+b), respectively. Here, $\Delta a=(m-m_c)f/mm_c$, $\Delta b=(m-m)f$ and $\Delta(a+b)=(m_c-m)(mm_c-1)f/mm_c$.

When changing copy magnification in a copying apparatus provided with a scanning optical system comprising first and second reflector means movable at a velocity ratio of 1:½, as already noted, it has heretofore been the usual practice to change the location of the focusing lens and to adjust the scanning optical system, thereby changing the aforementioned lengths of optical paths. More particularly, the length of optical path b is changed by changing the location of the focusing lens, and the lengths of optical paths a and (a+b) are changed by adjusting the scanning optical system while changing the location of the focusing lens, whereby the original to be copied and the photosensitive medium is brought into a new conjugate relation. Such adjustment of the scanning optical system as well as the location of the focusing lens effected during the change of copy magnification is intended to minimize the amount of displacement of the focusing lens required to change the length of optical path a. For example, a variable magnification copying apparatus usually permits selection of the full-size copy or the reduced-size copy and when copy magnification is changed from the full-size to the reduced-size copy, the length of optical path a is increased. When such increment Δa in the length of optical path is realized only by the displacement of the lens, the amount of displacement thereof unavoidably becomes great and this practically raises an inconvenience in terms of precision. For example, if magnification is to be changed from the full-size copy to 0.7 times copy, the length of optical path a must be increased by 3f/7 while the length of optical path b only need be decreased by 3f/10.

There are known some copying apparatuses which are provided with first and second reflector means movable at a velocity ratio of 1:½ and permit change of copy magnification. For example, U.S. Pat. No. 3,614,222, U.S. Pat. No. 3,884,574 and U.S. Pat. No. 3,914,044 disclose copying apparatuses in which one end of a wire passed over a movable pulley for moving second reflector means at one-half the velocity of first reflector means is displaced to change the location of the second reflector means to a location corresponding to a selected copy magnification. In such apparatuses, it is indispensable to keep the end portion of the wire always under tension by a spring or like resilient means in order to prevent the wire from being slackened by the displacement of that end of the wire during the change of copy magnification. Therefore, such apparatuses have suffered from less freedom of design and have offered an inconvenience in that the tension imparted from the spring or the like to the wire end tends to vary with each change of copy magnification to make the scanning of the original unstable. Such resilient means for preventing the slackening of the wire during the change of copy magnification is unnecessary in the copying apparatus disclosed in Japanese Patent Publication No. 34731/1976. In this apparatus, however, both the forward and the backward movement of the first and second reflector means are accomplished limitedly by the use of a single wire and this reduces the degree of freedom of apparatus construction. Also, such apparatus employs a pulley for magnification change over which the wire is passed, the wire having substantially the opposite ends thereof substantially anchored to the apparatus body, and which is for displacing the second reflector means to a position corresponding to a selected copy magnification by a predetermined angle of rotation of the pulley, namely, by simultaneous substantial displacement of the substantially opposite ends of the wire, and thus, the apparatus requires a special mechanism for stopping the rotation of such pulley against the rotative drive imparted thereto from the wire when the first and second reflector means are moved forwardly to scan the original or are moved backwardly.

Further, in the known apparatuses mentioned above, the second reflector means is displaced in parallel by copy magnification change with the first reflector means remaining stationary in place. Any error in the location of such second reflector means, by which the light flux from the first reflector means is reflected in a direction substantially opposite to the direction of incidence from the first reflector means, would lead to an approximately two-fold error in the length of the optical path. In those known apparatuses, therefore, the tolerance of the displacement of the second reflector means by a copy magnification change operation is so small that the displacing mechanism must be of extremely high precision.

SUMMARY OF THE INVENTION

It is a primary object of the present invention to provide a variable magnification copying apparatus which may overcome the above-noted disadvantages peculiar to the known apparatuses.

It is another object of the present invention to provide such a copying apparatus provided with a magnification changing mechanism in which the tension imparted to the wire for moving the reflector means is invariable irrespective of copy magnification change.

It is still another object of the present invention to provide such a copying apparatus which enables the original to be stably scanned for any copy magnification.

It is yet still another object of the present invention to provide such a copying apparatus in which no unreasonable force is exerted on the magnification changing mechanism when the first and second reflector means are advanced to scan the original or returned to the initial position.

It is a further object of the present invention to provide such a copying apparatus in which the adjustment of the scanning optical system for effecting copy magnification change may be accomplished without displacing that end of the reflector means moving wire which is substantially anchored to the apparatus body.

According to the preferred embodiment of the present invention, the copying apparatus is provided with a wire having one end secured to a rotatable member rotatively driven from a motor or the like and having the other end substantially secured to the apparatus body. A support member for the first reflector means is securely coupled to the wire, and the wire is passed over a movable pulley rotatably mounted on a support member for the second reflector means, between the coupling point of the wire to the first reflector means supporting member and the securing point of the wire to the apparatus body. As the wire is taken up by rotating the drive pulley, the first and second reflector means may be forwardly moved at a velocity ratio of $1:\frac{1}{2}$ in the same direction, due to the principle of the running pulley, thereby scanning an original to be copied. Between the drive pulley and the coupling point of the wire to the first reflector means supporting member, the wire is passed over a second pulley for changing the length of the optical path. Further, between the coupling point of the wire to the first reflector means supporting member and the securing point of the wire to the apparatus body, the wire is passed over a first pulley for changing the length of the optical path. More particularly, between said coupling point and the movable pulley, or between the movable pulley and the securing point of the wire to the apparatus body, the wire is passed over said first pulley. The first and second pulleys for changing the length of the optical path are rotatably mounted on a common pulley supporting member, and the wire is passed over the first and second pulleys substantially in the opposite directions. This pulley supporting member is laterally displaceable along the path defined by the wire from the first and second pulleys. When the copy magnification is changed, this pulley supporting member may be displaced. By an amount corresponding to the amount of such displacement, the first reflector means is displaced toward or away from the second reflector means to vary the length of the optical path between the original and the focusing lens.

Other objects and features of the present invention will become apparent from the following detailed description of the invention taken in conjunction with the accompanying drawings.

BRIEF DESCRIPTION OF THE INVENTION

FIG. 1 schematically illustrates an embodiment of the present invention.

DESCRIPTION OF THE PREFERRED EMBODIMENTS

Figure 1:
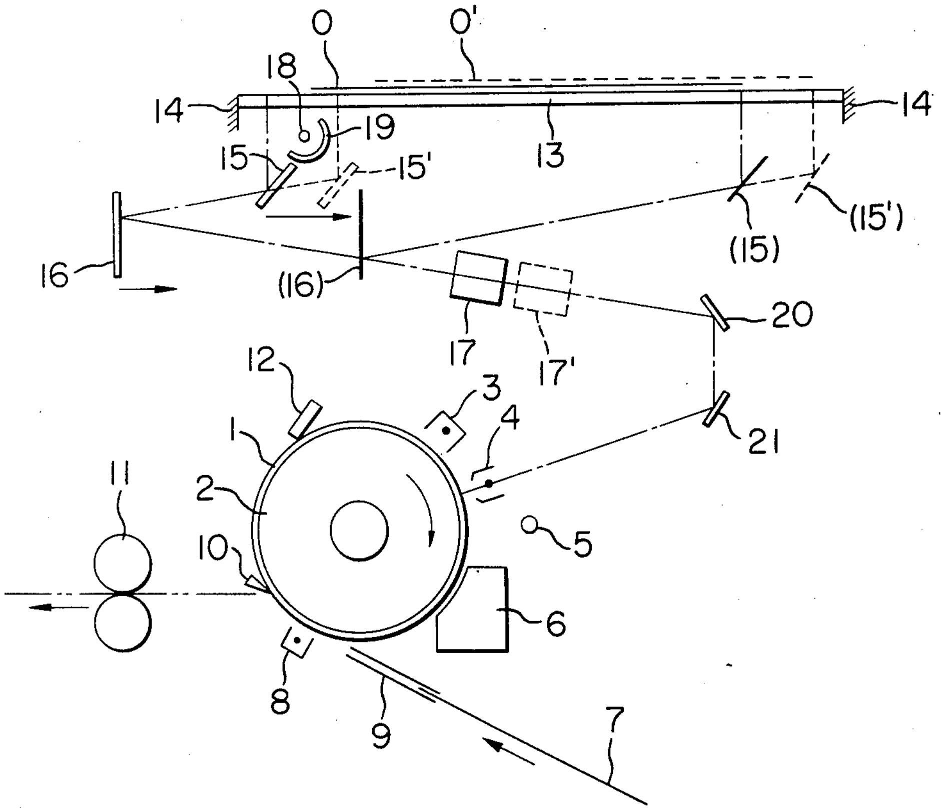

Referring to FIG. 1, a drum 2 having a photosensitive medium 1 comprising a conductive layer, a photoconductive layer and a transparent-surfaced insulating layer successively overlaid one upon another is supported in place within the apparatus and rotatable at a constant velocity in the direction of arrow by an electric motor, not shown. The rotational velocity of the drum 2 is invariable for any copy magnification. The surface of the photosensitive medium 1 is uniformly charged first by a DC corona discharger 3. Subsequently, the photosensitive medium 1 is slit-exposed to the image light from an image original to be copied, by an optical system which will further be described while, at the same time, it is subjected to AC corona discharge or DC corona discharge from a DC corona discharger 4 of the opposite polarity to the discharger 3. The discharger 4 is formed with a slit opening through which the focused image light may pass. The photosensitive medium 1 is then uniformly illuminated throughout its whole surface by a lamp 5, whereby an electrostatic latent image with high contrast corresponding to the image original is formed on the photosensitive medium. This latent image is developed by a developing device 6 of the magnet brush or like type supplying toner to the photosensitive medium 1. The resultant visible toner image is transferred to a sheet of transfer paper 7 transported at the same velocity as the peripheral velocity of the drum 2 with the back side of the transfer paper being subjected to the discharge from a corona discharger 8 which is of the opposite polarity to the charge of the toner in order to enhance the efficiency of image transfer. Transfer paper is fed one sheet after another from a cassette, not shown, in synchronism with the rotation of the drum and brought through a guide 9 into contact with the photosensitive medium, whereafter the transfer paper is separated from the photosensitive medium by a pawl 10. The transfer paper transport mechanism is well-known in the art. The toner image carried on the transfer paper 7 is fixed by a fixing device 11 of the heat roller or similar type. On the other hand, the residual toner on the surface of the photosensitive medium 1 after completion of the image transfer is removed therefrom by a cleaner 12 such as rubber blade or the like urged against the photosensitive medium, and the photosensitive medium 1 so cleaned is again used for another cycle of the image formation and treating process.

The image original 0 to be copied rests on a transparent, flat original carriage 13. The original carriage 13 is immovably fixed to an immovable member 14 which may be a side plate of the copying apparatus body. The original is scanned by a scanning optical system comprising first and second mirrors 15 and 16. The first and second mirrors 15 and 16 are moved in the direction of arrows, namely, in a direction parallel to the original carriage 13, and in synchronism with the rotation of the drum 2, when the photosensitive medium 1 is exposed to the image light from the original. The velocity of the first mirror 15 is equal to the peripheral velocity of the drum 2 or the photosensitive medium multiplied by the then magnification, i.e. the magnification of a focusing lens 17. Thus, when copying at the full-size magnification is to be effected (i.e. when the mirrors and lens are in their solid-line positions wherein the length of the optical path from the lens 17 to the image original is equal to that from the lens 17 to the photosensitive medium), the first mirror 15 is moved at a velocity equal to the peripheral velocity of the photosensitive medium 1. The velocity of the second mirror 16 is half the velocity of the first mirror 15. Since the velocity ratio of the first and second mirrors 15 and 16 is 1:½ and these are parallel-moved in the same direction, the length of the optical path between the lens 17 and the image original is maintained constant.

When the aforementioned optical system has scanned the original 0 from its one end to the other, namely, when the mirrors 15 and 16 have come to their respective positions (15) and (16), as shown, the mirrors stop moving, whereafter they are moved in the opposite direction to the direction of movement during the scanning, to return to their home positions (indicated at 15 and 16 by solid lines). The home position is the forward stroke starting position from which each mirror starts its reciprocal movement for scanning of the original, and accordingly the position whereat the mirror in its backward stroke comes to a halt.

A lamp 18 and a concave mirror 19 disposed behind it are supported integrally with the first mirror 15 by a support, not shown, and are movable with the first mirror 15. The lamp 18 is turned on only when the first mirror 15 is on its forward stroke, and cooperates with the concave mirror 19 to illuminate the original 0. The light reflected by the original 0 is reflected by the first mirror 15 toward the second mirror 16, by which the light is in turn reflected in a direction substantially opposite to the direction of incidence and directed toward the focusing lens 17. The focusing light flux emergent from the lens 17 is reflected by fixedly positioned third and fourth mirrors 20 and 21 in succession, and then impinges on the photosensitive medium 1, as already noted. In FIG. 1, it is to be understood that the lens as disposed at the solid-line position 17 serves to form a full-size image of the original on the photosensitive medium 1. Thus, both of the aforementioned lengths of optical paths a and b are 2f.

To change the copy magnification, the lens 17 may be displaced, e.g. along the optic axis, by an amount corresponding to a selected copy magnification m and the first mirror 15 may be displaced parallel to the original carriage 13 by an amount corresponding to the selected copy magnification m, through an operation which will further be described. More specifically, the lens 17 and the mirror 15 may be displaced to their respective positions corresponding to the selected copy magnification m, thereby making the lengths of optical paths a and b equal to (m+1)f/m and (m+1)/f, respectively, as already mentioned. When m is less than 1, namely, when reduced-size copy is to be effected, the first mirror 15 and the lens 17 may be displaced to their broken-line positions 15' and 17' as indicated in FIG. 1. In other words, the first mirror 15 and the lens 17 may be displaced by their predetermined amounts away from the second mirror 16. In the embodiment of FIG. 1, the third and fourth mirrors 20 and 21 are fixed in position and therefore, the amount of displacement of the lens 17' is $\{2f-(m+1)f\}$, i.e. $(1-m)f$. Thus, the amount of displacement of the first mirror 15 is $[(m+1)f/m-\{2f+(1-m)f\}]$, i.e. $(m-1)^2f/m$. When m is greater than 1, namely, where the apparatus is for enlarged-size copying, the first mirror 15 and the focusing lens 17 may be displaced by an amount corresponding to the magnification m, toward the second mirror 16, through copy magnification change operation.

In FIG. 1, when reduced-size copy is to be effected, the first mirror 15 is moved forwardly for scanning the original with the broken-line position 15' as its home position and when this mirror has scanned the original from its one end to the other by moving over a distance preset in accordance with the width of the original that can be copied, namely, when the first mirror has come to its position indicated at (15'), this mirror returns to its home position 15'. In FIG. 1, the home position and the turn-back point of the second mirror 16 are invariable irrespective of any change in magnification. The forward movement velocity of the first mirror 15 between the positions 15 and (15') is equal to the peripheral velocity of the photosensitive medium 1 multiplied by 1/m, and the forward movement velocity of the second mirror 16 is one-half of that of the first mirror. In FIG. 1, as described above, the home position of the first mirror 15 differs from the full-size copy to the reduced-size copy (or the enlarged-size copy) and therefore, the position of the image original on the original carriage must be varied for the respective cases, as indicated at 0 and 0'. It would thus be convenient if the original carriage was provided with marks to which the scanning start end of the original is to be registered for respective magnifications. However, in order to stabilize the movement of the mirrors at the start of scanning, it is usually practised to cause the mirrors to effect preparatory slight movement before scanning the scanning start end of the original. For this reason, the position of the scanning start end of the original is deviated in the forward movement direction of the first mirror from the point of the original carriage opposed to by the first mirror in its home position, by a distance corresponding to the distance of said preparatory movement of this mirror.

Figure 2:
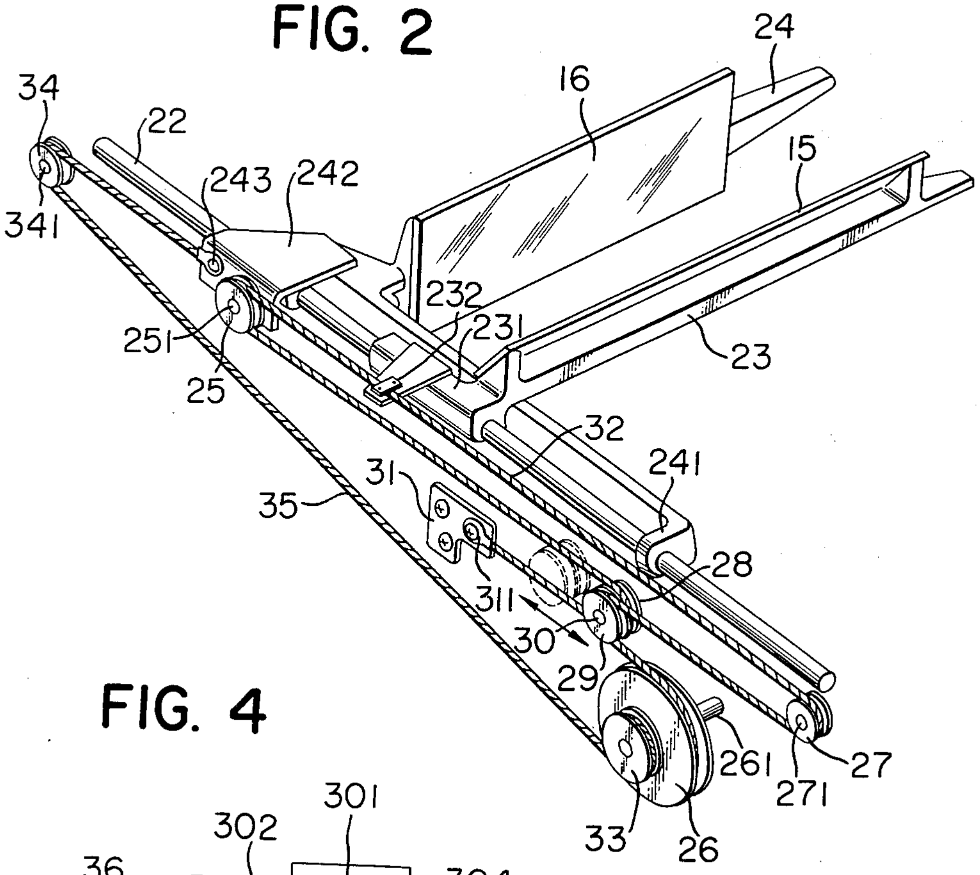
FIG. 2 illustrates essential portions of the first embodiment of the present invention.

FIG. 2 shows an example of the means for moving the first and second mirrors 15 and 16. Designated by 22 is a guide rail secured to a side plate or the like of the apparatus body. The rail 22 is disposed parallel to the original carriage 13 and guides the movement of the first and second mirrors 15 and 16. More particularly, the leg portion 231 of a first support member 23 securely supporting the first mirror 15, the lamp 18 and the mirror 19 and the opposite leg portions 241 and 242 of a second support member 24 securely supporting the second mirror 16 are slidably fitted on the guide rail 22 in such a manner that these leg portions do not interfere with one another. The first and the second support members 23 and 24, respectively are reciprocally movable along the guide rail 22 by utilization of the principle of the running pulley. Alternatively, the first and the second support members may be supported and guided by discrete guide rails.

Figure 3:
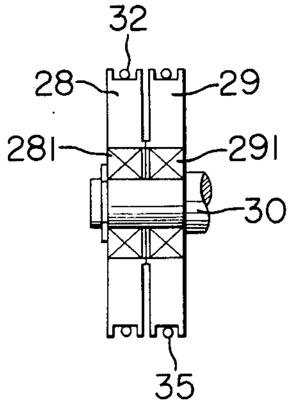
FIG. 3 illustrates an example of first and second pulleys for changing the length of the optical path.

Designated by 25 is a pulley rotatably mounted on a shaft 251, secured to the leg portion 242 of the second support member, and movable with the second mirror 16. Denoted by 26 is a drive pulley secured to a shaft 261 rotatable in forward or backward direction by the drive from an electric motor, to be described, through a forward rotation clutch or a backward rotation clutch, which is also to be described, the shaft 261 not being rotated during non-operation of the two clutches. The drive pulley 26 is disposed at a predetermined position which lies beyond the terminus of the forward stroke of the movable pulley 25. Designated by 27 is a pulley rotatably mounted on a shaft 271 secured at a predetermined position which lies beyond the terminus of the forward stroke of the securing point whereat a wire is secured to the leg portion of the first support member 23, which securing point will further be described. Pulleys for magnification change operation 28 and 29 are individually mounted for rotation on a shaft 30, as shown in FIG. 3. More particularly, the pulleys 28 and 29 are coupled to ball bearings 281 and 291 individually rotatably fitted on the shaft 30. The shaft 30 and accordingly, the pulleys 28, 29 lie at a position between the pulleys 25 and 27 and between the pulleys 25 and 26, wherever the pulley 25 may lie. The shaft 30 and accordingly, the pulleys 28, 29 are displaceable parallel to the guide rail 22 within a predetermined range of distance, by an amount corresponding to a selected magnification, upon magnification change operation. When the magnification is changed from the full-size copy to the m-times reduced-size copy, the pulleys 28 and 29 are displaced by $(m-1)^2f/2m$ from their solid-line position to their broken-line position. Conversely, when the magnification is changed from the reduced-size copy to the full-size copy, the pulleys 28 and 29 are displaced from their broken-line position to their solid-line position. In other words, the pulleys 28 and 29 are integrally displaced in the same direction to a position corresponding to a selected magnification by copy magnification change operation. Designated by 31 is a wire securing member disposed at a predetermined position opposite from the pulley 26 with respect to the pulley 28 wherever this pulley 28 may lie. The wire 32 for forwardly moving the first and second mirrors 15, 16 to scan the original has one end secured to the drive pulley 26 and passes over the second pulley 29 for magnification change, the fixedly positioned pulley 27, the movable pulley 25 and the first pulley 28 for magnification change, the other end of the wire 32 being secured to the securing member 31 by means of screws 311. Between the pulleys 25 and 27, the wire 32 is secured to the leg portion 231 of the first mirror supporting member 23 by means of a securing member 232. In the example shown in FIG. 2, the wire 32 between the various pulleys and between the pulley 29 and the member 31 extends substantially parallel to the guide rail 22 and passes over the pulleys 28 and 29 substantially in the opposite directions.

When the original is to be scanned to form an electrostatic latent image on the photosensitive medium 1, the aforementioned forward rotation clutch may be operated to rotate the drive pulley 26 substantially at the peripheral velocity of the photosensitive medium 1 multiplied by the inverse number of the selected copy magnification, whereby this pulley 26 may wind up the wire 32 at the above-mentioned velocity, thereby effecting forward movement of the first and second mirrors 15 and 16 at the aforementioned velocities. Thus, the wire 32 pulls on and moves the first support member 23 with the aid of the securing point, and also rotates and pulls on the movable pulley 25 to move the second support member 24 at half the velocity of the first support member. At the same time, the pulleys 27 and 29 are also in rotation but the pulley 28 is not. The shaft 30 of the pulleys 28, 29 remains stationary at a position corresponding to the selected magnification.

In FIG. 2, a mechanism to be hereinafter described is employed to return the first and second mirrors 15 and 16 to their respective start positions after termination of the scanning of the original. A pulley 33 having a diameter equal to half the diameter of the drive pulley 26 is secured on the rotary shaft 261 of the drive pulley. Thus, the pulley 33 is rotatable at half the peripheral velocity of the pulley 26 and in the same direction as the latter. On the other hand, a pulley 34 is rotatably supported on a shaft 341 fixed at a predetermined position opposite from the pulley 33 with respect to the pulley 25. Wire 35 has one end portion thereof wound on a pulley 33 in the opposite direction to the direction in which the wire 32 is wound on the pulley 26, and that end of the wire 35 is secured to the pulley 33. The wire 35 thence passes over a pulley 34 and the other end of the wire 35 is secured to the leg 242 of the second support member by means of a securing member 243. Thus, the wire 35 is stretched with respect to the second support member 24 in the opposite direction to the direction in which the wire 32 is stretched with respect to the pulley 25. Between the members 243 and 34, the wire 35 extends substantially parallel to the guide rail 22. Rotation of the drive pulley 26 in the forward direction causes rotation of the pulley 33 in the forward direction, which in turn pays away the wire 35 as it is pulled on by the leg 242. When the aforementioned backward rotation clutch is operated, the pulley 33 takes up the wire 35 to effect backward movement of the second support member 24. When this occurs, the pulley 25 is rotated and pulls on the wire 32 and the amount of the wire so pulled on is paid away by the pulley 26 which is not rotating in the backward direction, so that the first support member 23 is also moved backwardly. The backward movement velocity ratio of the first and second mirrors 15 and 16 is also $1:\frac{1}{2}$. Also during the backward movement of the mirrors, the pulleys 27 and 29 are rotated but the pulley 28 is not and the shaft 30 remains stationary at a position corresponding to the selected magnification. In FIG. 2, the pulley 33 is mounted on the common shaft 261 with the pulley 26, but alternatively the pulley 33 may be mounted on a separate shaft and a gear train may be employed to transmit the rotation of the shaft 261 to the pulley 33. As a further alternative, the pulley 33 may be driven by separate drive means from that for the pulley 26. In short, it is essential to rotate the pulley 33 so that the wire 35 may be rewound and wound at one-half of the velocity whereat the wire 32 is wound and rewound on the pulley 26.

When the copy magnification is changed from the full-size to the reduced-size copy, the shaft 30 and accordingly the pulleys 28, 29 are displaced from their solid-line position of FIG. 2 to their broken-line position, as already noted. At this time, the pulley 26 is not in rotation. With the pulleys 28 and 29 so displaced, the wire 32 between the pulleys 25 and 27 is pulled on toward the pulley 27 and the wire 32 between the pulleys 25 and 28 is pulled on toward the pulley 25. Thus, the first support member 23 and accordingly the first mirror 15 is displaced away from the second mirror 16. At this time, the pulleys 25, 27, 28 and 29 are in rotation while the pulleys 26, 33 and 34 are not. The amount of displacement of the first mirror 16 is the same as already mentioned. Even after the displacement of the pulleys 28 and 29, the operations of the various members involved to effect the forward and backward movements of the first and second mirrors are the same as already described, with the exception that the rotational velocity of the shaft 261 is changed to a velocity corresponding to the selected copy magnification. Although not specifically described, other embodiments will be apparent from what has been and will be described.

As described above, the wire 32 for effecting forward movement of the first and second mirrors are wound substantially in the opposite directions on the two pulleys 28 and 29 individually rotatably mounted on a common support member and these two pulleys are displaceable between the opposite ends of such wire 32 to accomplish the magnification change operation, and such arrangement prevents the tension in the wire 32 from being varied even by the magnification change operation. Also, the displaceability of the first mirror 15 by the aforementioned magnification change operation readily permits the length of the optical path to be changed with great accuracy.

Figure 4:
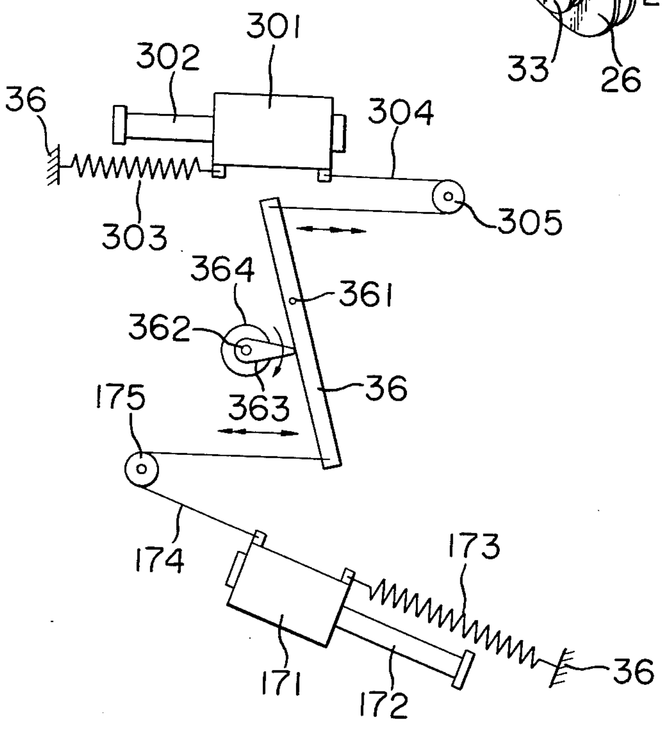
FIG. 4 illustrates a mechanism for displacing the displaceable pulleys and lens.

FIG. 4 shows an example of the mechanism for displacing the pulleys 28, 29 for magnification change operation and the lens 17. The shaft 30 rotatably supporting the pulleys 28 and 29 is secured to a shaft supporting member 301. The shaft supporting member 301 is slidably supported on a guide rail 302 extending parallel to that portion of the wire 32 stretched to the pulleys 28, 29, and in the present case, parallel to the mirror guide rail 22. On the other hand, the focusing lens 17 is coupled to a lens support member 171 which in turn is slidably supported on a guide rail 172 extending parallel, for example, to the optic axis of the lens 17. The guide rail 172 may be oriented so that the lens 17 is displaceable in a direction having vector components along the optic axis and along the rotary shaft of the photosensitive drum 2. By this, one end of the image at any of various magnifications may be registered to a predetermined end position of the photosensitive medium. The guide rails 172 and 302 have enlarged portions at their opposite ends for abutting with the corresponding ends of the associated support members 171 and 301 to stop movement of these support members. When the associated support members 171 and 301 have come into abuttment with the corresponding enlarged ends of the guide rails 172 and 302, the focusing lens 17 and the first mirror 15 assume their positions corresponding to the selected copy magnification.

The lens supporting member 171 and the shaft supporting member 301 are biased along their associated guide rails 172 and 302 by tension springs 173 and 303 fixed in position by being secured at one end to the supporting members 171 and 301 and at the other end to immovable members such as beams of the apparatus body. Wire 174, 304 is secured at one end to that side of the supporting member 171, 301 which is opposite from the tension spring. Wires 174 and 304 respectively pass over pulleys 175 and 305 rotatably disposed in place, and the other ends of these wires are engaged with the opposite ends of a lever 36. The lever 36 is supported for pivotal movement within a predetermined angular range on a pivot shaft 361 secured in position, i.e. to an immovable member of the apparatus body. The length of the lever between the pivot shaft 361 and the securing point of the wire 174 and the length of the lever between the pivot shaft 361 and the securing point of the wire 304 is at a ratio of $(1-m)f:(m-1)^2f/2m$. To change the copy magnification, the lever 36 may be pivotally moved about the pivot shaft 361, whereby the supporting members 171 and 301 and accordingly, the lens 17 and the shaft 30 may be brought to their positions corresponding to the selected magnification. Such pivotal movement of the lever 36 may be accomplished by a cam 363 secured to a shaft 362 which may effect a half of one full rotation upon each magnification change operation by taking the rotative drive from an electric motor 364 operable upon magnification change operation. The cam 363 is shown to bear against the lever 36. In the position of FIG. 4, the lens 17 and the first mirror 15 are in their solid-line positions shown in FIG. 1 and accordingly, the pulleys 28 and 29 are in their solid-line positions shown in FIG. 2. As the cam 363 is caused to make a half of one full rotation upon rotation of the motor 364, the lever 36 is pivotally moved to permit the supporting members 171 and 301 to be pulled on by the springs 173 and 303 and displaced along the rails 172 and 302 to predetermined positions. Thus, the pulleys 28 and 29 are displaced to their broken-line positions shown in FIG. 2, so that the first mirror 15 and the lens 17 are displaced to their respective broken-line positions 15′ and 17′ shown in FIG. 1. To displace the lens and the first mirror once more, the motor 364 may be operated to cause the cam 363 to make another half of one full rotation.

Figure 5:
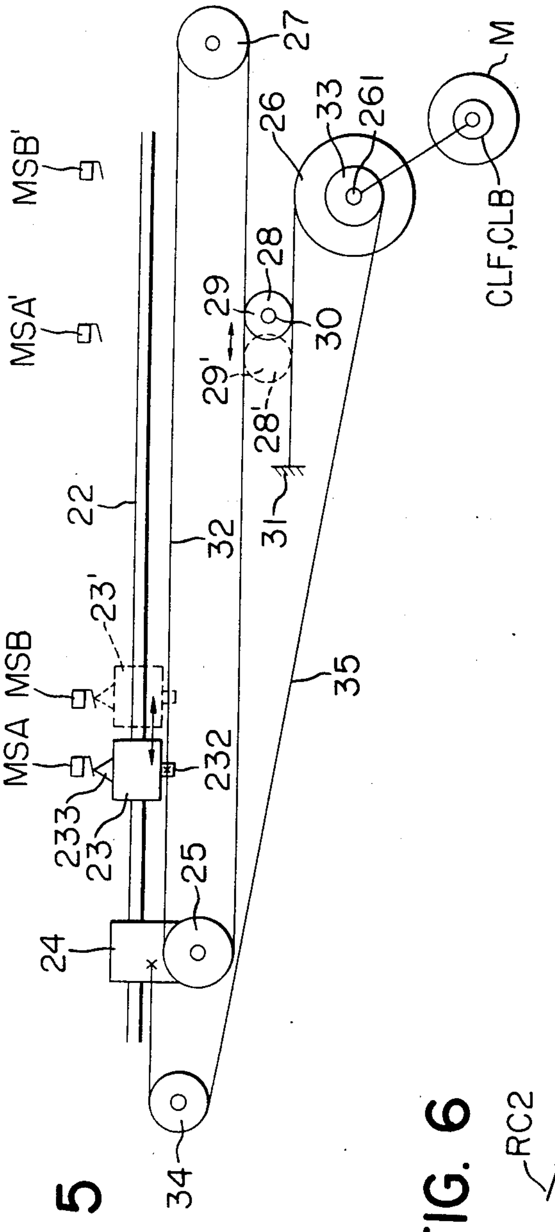
FIGS. 5 and 6 illustrate an example of the control means for controlling the movment of first and second mirrors.
Figure 6:
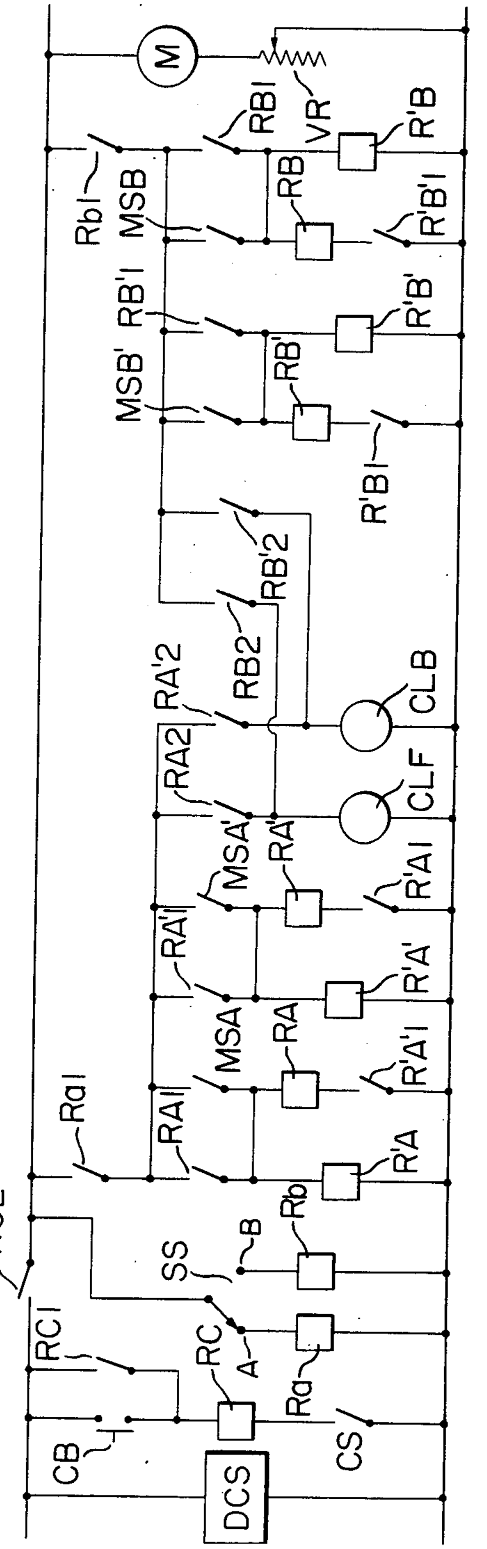

Reference is now had to FIGS. 5 and 6 to describe the control circuit for controlling the movements of the first and second mirrors 15 and 16. In FIG. 5, MSA, MSA′, MSB and MSB′ are microswitches disposed along the mirror supporting guide rail 22. The microswitch MSA lies at a point corresponding to the home position of the first mirror during the full-size copy (the solid-line position 15 in FIG. 1), and the microswitch MSA′ lies at a point corresponding to the turn-back point of the first mirror during the full-size copy (the solid-line position (15) in FIG. 1). The microswitch MSB lies at a point corresponding to the home position of the first mirror during the reduced-size copy (the broken-line position 15′ in FIG. 1), and the microswitch MSB′ lies at a point corresponding to the turn-back point of the first mirror during the reduced-size copy (the broken-line position 15′ in FIG. 1). The spacing between the microswitches MSA and MSA′ and the spacing between the microswitches MSB and MSB′ are predetermined in accordance with the desired size of the original to be copied. These microswitches MSA, MSA′, MSB and MSB′ are adapted to be closed by being touched by an actuating member 233 projected from the first mirror supporting member 23.

In FIG. 6, DCS is a DC power source and SS is a change-over switch which is adapted to be closed at its contact A when the copy magnification is 1 (one) and closed at its contact B when the copy magnification is m. When the switch SS is closed at the contact A, depression of a copy button CB energizes a relay Ra to close a switch Ra1. When the switch SS is closed at the contact B, depression of the copy button CB energizes a relay Rb to close a switch Rb1. CS is a switch operatively controlled by a counter, not shown. This counter is operable by depression of the copy button CB to count the number of times that the second mirror moves backwardly to its home position (this number is equal to the number of copies to be obtained). Thus, this counter closes the switch CS upon depression of the copy button CB, and opens the switch CS when the returns of the second mirror to its start position has reached the number of times corresponding to the number of copies set for this counter prior to copying. VR is a variable resistor adjustable to vary the input to a DC motor M for driving the drive pulley 26, in accordance with the selected copy magnification. Thus, for the copy magnification 1, the motor M runs at such a number of revolutions that makes the peripheral velocity of the pulley 26 substantially equal to that of the photosensitive medium 1, and for the copy magnification m, the motor M runs at such a number of revolutions that makes the peripheral velocity of the pulley 26 substantially equal to the peripheral velocity of the photosensitive medium multiplied by 1/m.

When, as shown in FIG. 5, the microswitch MSA is closed by being actuated by the first mirror supporting member 23, namely, when the set magnification is 1, depression of the copy button CB with the counter having been set to a desired number of copies energizes a relay RC to close switches RC1 and RC2. The closing of the switch RC1 holds the relay RC energized until the switch CS is opened. Since the switch SS is closed at its contact A, the closing of the switch RC2 energizes the relay Ra to close the switch Ra1, but the switch Rb1 remains open.

Switch R'A'1, which is adapted to be opened upon energization of a relay R'A', is now closed. The microswitch MSA is also closed and so, relay RA is energized to close switches RA1 and RA2. The closing of the switch RA1 holds the relays RA and R'A energized. By the energization of the relay R'A, switch R'A1 is opened. On the other hand, the closing of switch RA2 operates a clutch CLF for forward rotation which transmits the drive from the motor M to the shaft 261 of the pulley 26. In the meantime, the motor M is running at a speed corresponding to the copy magnification 1 set by the variable resistor VR upon closing of the switch RC2, as already noted. Accordingly, the first mirror supporting member 23 begins to move forward toward the microswitch MSA' at a velocity equal to the peripheral velocity of the photosensitive medium 1, and the second mirror supporting member 24 also begins to move forward at half the velocity of the first mirror supporting member. In other words, the first and second mirrors 15 and 16 effect forward movement to scan the original. It will be noted that the relay RA also serves to operate the switch of the original illuminating lamp 18.

When the first mirror supporting member 23 arrives at the microswitch MSA' to close it, the relay R'A' is energized to open the switch R'A'1, so that the relay RA is deenergized to open the switch RA1 also. Consequently, the relay R'A is deenergized to close the switch R'A1, so that relay RA' is energized to close switches RA'1 and RA'2. The closing of the switches RA'1 holds the relays RA' and R'A' energized. The energized relay R'A' opens the switch R'A'1. On the other hand, as already noted, the deenergization of the relay RA has opened the switch RA2 and closed the switch RA'a, a clutch CLB for backward rotation transmits the drive from the motor M to the pulley driving shaft 261. Thus, the first and second mirror supporting members 23 and 24 begin to move backwardly. In other words, the first and second mirrors 15 and 16 effect backward movement. At this time, the lamp 18 is turned off. When the first mirror supporting member 23 again actuates the microswitch MSA, the first and second mirrors 15 and 16 again start forward movement and when they have scanned the original, namely, when the first mirror supporting member 23 actuates the microswitch MSA', the first and second mirrors start backward movement. When the above-described cycle has been repeated the number of times corresponding to the desired number of copies, the switch CS is opened to deenergize the relay RC and accordingly open the switch RC2, so that the motor M stops running and the first and second mirrors 15 and 16 stop moving. At this time, the first mirror supporting member is stopped while touching the microswitch MSA. That is, the first and second mirrors 15 and 16 are at their respective home positions.

When the copy magnification is changed to m, the switch SS is closed at its contact B and the variable resistor VR adjusted to set the number of revolutions of the motor M in the manner as already described. The pulleys 28, 29 are displaced to their broken-line positions 28', 29' in FIG. 2 or 5, as already noted. This causes the first mirror supporting member 23 to be displaced to its broken-line position 23' (the home position during the magnification m), in which the member 23 touches the microswitch MSB to close it. This is the forward stroke start position of the first mirror supporting member 23, and the turn-back point of this member is the position in which it touches the microswitch MSB' to close the same. When the copy button is depressed with the counter having been set to a desired number of copies, similar operations to those described above will take place. By substituting the symbols B and b for A and a in the foregoing description, one could understand the operations of the first and second mirror supporting members 23, 24 and the first and second mirrors 15, 16 during the reduced-size copy.

In the apparatus illustrated in connection with FIGS. 5 and 6, the position of the image original resting on the original carriage must be changed each time the magnification is changed. However, this is not necessary in an embodiment to be described below. Moreover, the control circuit becomes more simplified.

Figures 7, 8:
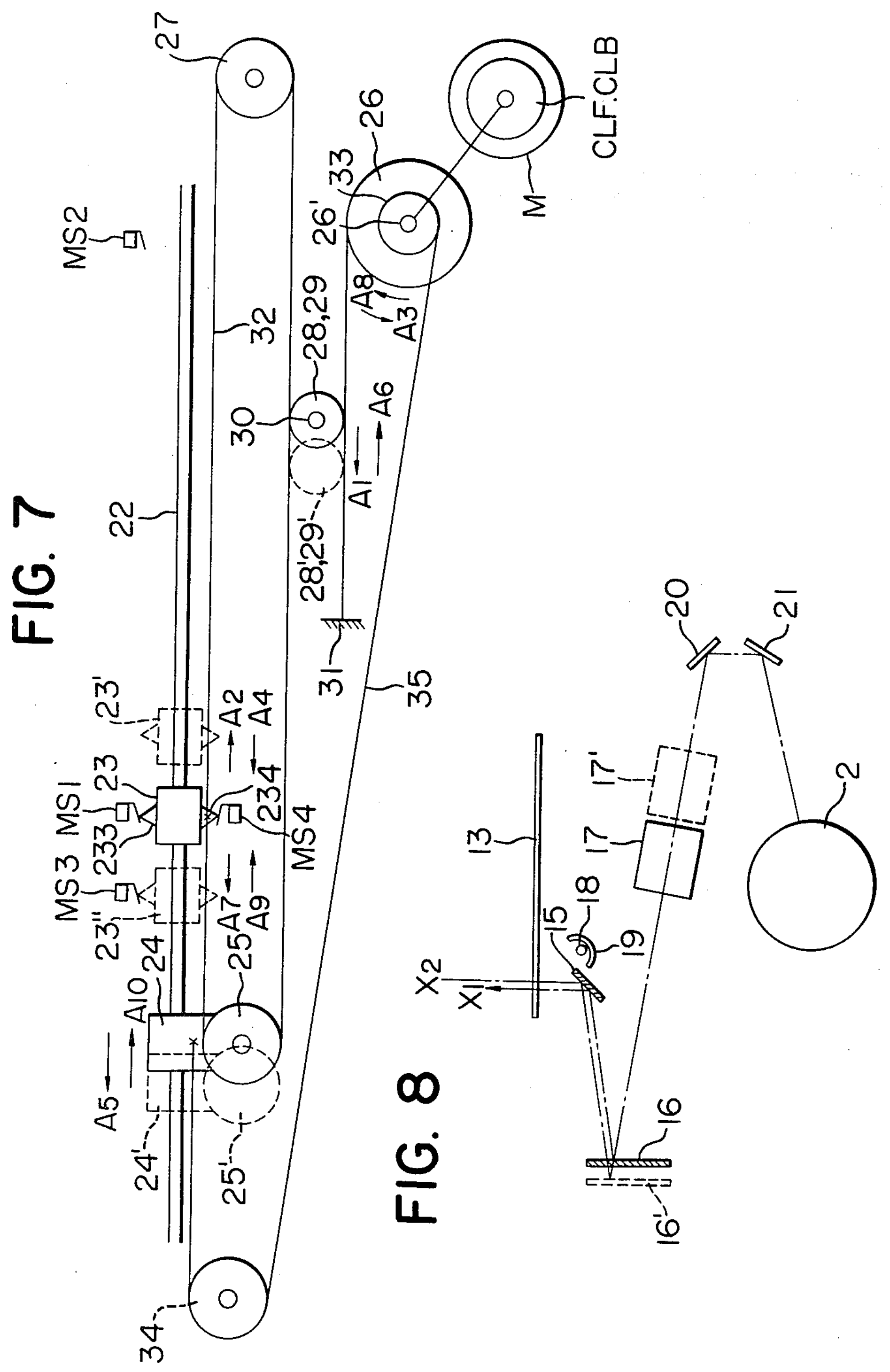
FIGS. 7, 8 and 9 illustrate further examples of the control means for controlling the movement of first and second mirrors.

In FIG. 7, microswitches MS1, MS2, MS3 and MS4 are disposed along the mirror guide rail 22. The spacing between the microswitches MS1 and MS2 is set in accordance with the maximum width of the original that can be copied. The microswitches MS1 and MS4 lie at points where they are touched by actuating member 233, 234 of the supporting member 23 when the first mirror 15 is in its home position for scanning the original, and the microswitch MS2 lies at a point whereat it is touched by the actuating member 233 of the supporting member 23 when the first mirror 15 has arrived at its turn-back point after having scanned the original across its entire width. The microswitch MS3 lies at a point where it is touched by the actuating member 233 of the first mirror supporting member 23 when the pulleys 28, 29 have been brought back from their broken-line position to their solid-line position. The microswitches MS1, MS3 and MS4 are adapted to be closed by being touched by the supporting member 23, while the microswitch MS2 is adapted to be opened by being touched by the supporting member 23.

Before the control circuit is explained, the embodiment of FIG. 7 is briefly described. With the copy magnification change operation, the focusing lens 17 and the pulleys 28, 29 are displaced by the means shown in FIG. 4. If the magnification is changed from the full-size to the reduced-size copy, the pulleys 28 and 29 are displaced in the direction of arrow $A_1$ from their solid-line position to their broken-line position in FIG. 7. As already noted, this causes the first mirror supporting member 23 to be moved in the direction of arrow $A_2$ from its solid-line position to its broken-line position 23'. In the present embodiment, by depression of the copy button, the pulleys 26 and 33 are then rotated to pay away the wire 32 from the pulley 26 and to have the wire 35 taken up by the pulley 33, whereby the first mirror supporting member 23 is displaced in the direction of arrow $A_4$ from its broken-line position 23' temporally to the position for touching the microswitch MS1. Simultaneously therewith, the pulley 25 and accordingly the second mirror supporting member 24 is displaced in the direction of arrow $A_5$, and stopped at their respective broken-line positions 25' and 24' when the supporting member 23 is stopped. The amount of such displacement of the pulley 25, i.e. the supporting member 24, in the direction of arrow $A_5$, is one-half of the amount of said displacement of the supporting member 23, i.e. the first mirror 15, in the direction of arrow $A_4$. During the displacement of the supporting members 23, 24 to the original scanning start position, the pulleys 29, 27, 25 and 34 are rotated but the pulley 28 is not. The pulleys 28 and 29 remain stationary at their broken-line position.

When the magnification is changed from the reduced-size to the full-size copy, the pulleys 28 and 29 are displaced in the direction of arrow $A_6$ from their broken-line position to their solid-line position. At the same time, the first mirror supporting member 23 is displaced in the direction of arrow $A_7$ along the guide rail 22, from its solid-line position to its broken-line position 23''. The pulley 25 and accordingly, the second mirror supporting member 24 remain stationary at their broken-line positions 25' and 24', respectively. When the copy button is then depressed, the microswitch MS3 acts to rotate the pulleys 26 and 33 in the direction of arrow $A_8$, which in turn displace the first mirror supporting member 23 and the second mirror supporting member 24 in the directions of arrows $A_9$ and $A_{10}$, respectively, and back to their solid-line positions. When this occurs, the pulley 29 is in rotation but the pulley 28 is not and these pulleys remain at their solid-line position. When the first mirror supporting member 23 and the second mirror supporting member 24 return to their solid-line positions, namely, their home positions, the microswitch MS4 acts to turn on the lamp 18 and the microswitch MS1 acts to cause the first and second mirror supporting members 23 and 24 to start moving for scanning the original.

Thus, although the home position of the second mirror 16 is changed with the copy magnification change, the home position of the first mirror 15 directly facing the original to be copied can be made common for all copy magnifications and accordingly, the set position of the scanning start end of the original on the original carriage can be made common for all copy magnifications. However, when the first mirror is displaced to such a common home position by the magnification change operation, or when the home position of the second mirror is changed in accordance with a selected copy magnification, the position of the optic axis of the lens 17 which is reflected toward the original carriage 13 by the second and first mirrors 16 and 15 in succession is displaced as shown in FIG. 8. In FIG. 8, reference character 16' designates the home position of the second mirror 16 when the copy magnification is changed from the full-size to the reduced-size copy. Designated by $X_1$ is the optic axis for the full-size copy, and $X_2$ the optic axis for the reduced-size copy. There is a distance between $X_1$ and $X_2$, but this distance is extremely small and raises no inconvenience in practice.

For any copy magnification, the position to which the scanning start end of the original should be registered may be determined with the optic axis $X_1$ or $X_2$ or the position between $X_1$ and $X_2$ as the reference. Usually, a slight difference is present between the home positions of the first and second mirrors and the positions in which they begin to cooperate to scan the original and such difference may be forwardly displaced during each forward stroke of the second mirror to thereby stabilize the movement of the first and second mirrors when they begin to scan the original.

Figure 9:
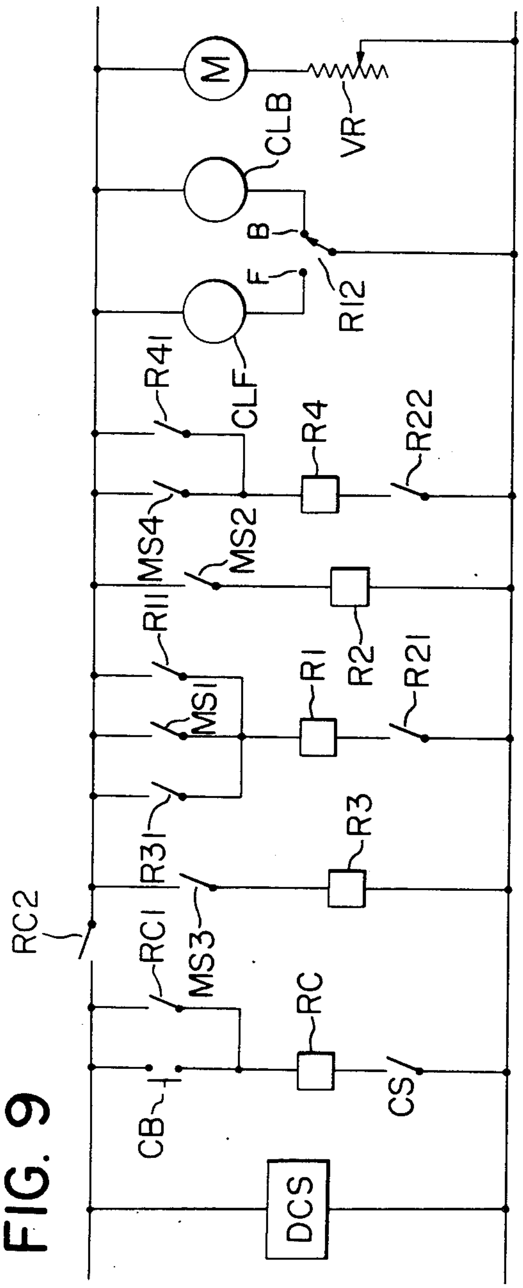

Referring to FIG. 9, the control circuit shown there is similar to that of FIG. 6 in that it includes a DC power source DCS, a copy button CB, a motor M, a variable resistor VR for adjusting the input to the motor M to rotate the motor M at a number of revolutions corresponding to the desired copy magnification, a clutch CLF for transmitting the drive of the motor M to the pulley shaft 261 in the form of forward rotation, and a clutch CLB for transmitting the drive of the motor M to the pulley shaft 261 in the form of backward rotation. Designated by CS is a switch ON-OFF-controlled by a counter, not shown. The counter is operable upon depression of the copy button CB to count a set of movements, i.e., the movements of the first mirror 15 to its turn-back point and back to its home position, as count one. Therefore, the number counted by this counter equals the number of copies. The switch CS is adapted to be closed upon depression of the copy button CB, and to be opened when the counter has counted the preset desired number of copies.

Assume that the first and second mirror supporting members 23 and 24 are in their home positions indicated by solid lines and that the full-size copy is to be effected. Microswitches MS1, MS2 and MS4 are all in closed position. When the copy button is depressed with the counter having been set to a desired number of copies, relay RC is energized to close switches RC1 and RC2. The closing of the switch RC1 holds the relay RC energized until the switch CS is opened. The microswitch MS2 is now in closed position, so that relay R2 is energized to close switches R21 and R22. On the other hand, the microswitches MS1 and MS4 also are in closed position, so that relays R1 and R4 are also energized to close switches R11 and R41. The closing of the switches R11 and R41 holds the corresponding relays R1 and R4 energized until the switches R21 and R22 are opened. Relay R4 serves to control an unshown switch between the lamp 18 and the power source, and when energized, it closes this switch to turn on the lamp. On the other hand, relay R1 also controls switch R12 and when energized, it closes switch R12 at its contact F. This operates the clutch CLF for forward rotation. Since the motor M is rotated by the closing of switch RC2, the operation of the clutch CLF causes the first and second mirror supporting members 23, 24 and accordingly the first and second mirrors 15, 16 to begin forwardly moving at a velocity ratio of 1:½. At this time, the original is being illuminated by the lamp 18 and scanned by the forwardly moving first and second mirrors 15, 16, and projected on the photosensitive medium 1 in the slit-exposure fashion. When the first and second mirrors 15 and 16 have scanned the original from its one end to the other and come to their turn-back points, the first mirror supporting member 23 touches the microswitch MS2 to open the same. Thereupon, the relay R2 is deenergized to open switches R21 and R22. The opening of the switch R22 deenergizes the relay R4, so that switch R41 is opened and the switch for the lamp is also opened, thus turning off the lamp 18. On the other hand, the opening of the switch R21 deenergizes the relay R1, so that switch R11 is opened and the switch R12 is changed over to its contact B. This operates the clutch CLB for backward rotation to cause the first and second mirrors 15, 16 to start backward movement toward their home positions. When the first mirror supporting member 23 having started its backward movement is disengaged from the microswitch MS2, this microswitch is closed to energize the relay R2 which in turn closes the switches R21 and R22. When the first and second mirrors 15, 16 and accordingly, the first and second mirror supporting members 23, 24 return to their home positions, the first mirror supporting member 23 closes the microswitch MS1, so that the forward and backward movements of the first and second mirrors 15, 16 are again repeated. In this manner, the first and second mirrors 15, 16 are reciprocated the number of times corresponding to the number of copies set for the aforementioned counter and come to their home positions, whereupon the switch CS is opened. By this, relay RC is deenergized to open switch RC1 and switch RC2, thereby deenergizing the motor M. Thus, the first and second mirrors 15, 16 are stopped from moving.

Now, when the magnification is changed from the full-size to the reduced-size copy, namely, when the pulleys 28, 29 are displaced from their solid-line position of FIG. 7 to their broken-line positions 28', 29', the first mirror supporting member 23 is displaced from its solid-line position to its broken-line position 23'. At this time, the second mirror supporting member 24 is stationary. By such displacement of the first mirror supporting member 23, the microswitch MS3 is opened. When the copy button CB is depressed with the aforementioned counter having been set to a desired number of copies, the relay RC is energized to close the switch RC2, so that the motor M starts running. Since the microswitch MS2 is in closed position, the relay R2 is energized to close the switches R21 and R22 but the microswitches MS1 and MS4 are in opened position, so that the relays R1 and R4 remain unenergized. Thus, the lamp 18 is in turned-off condition and the switch R12 is closed at its contact B. Accordingly, the clutch CLB for backward rotation is operated to cause the first and second mirrors 15, 16 to move backwardly until the first mirror supporting member 23 touches microswitch 23, namely, until the first and second mirrors come back to their home positions. Upon arrival of these mirrors at their home positions, the microswitch MS1 is closed to cause the mirrors 15 and 16 to move forwardly. At the same time, the microswitch MS4 is closed to turn on the lamp 18. Thereafter, as already described, the first and second mirrors 15 and 16 repeat their reciprocal movements while scanning the original the number of times corresponding to the set number of copies and when they have come to their home positions, the switch CS is opened to stop the motor M from running. During the reduce-size copy, as already noted, the variable resistor VR is adjusted to regulate the input to the motor M and the pulley 26 is rotated at a peripheral velocity substantially equal to the peripheral velocity of the photosensitive medium 1 multiplied by the inverse number of the copy magnification.

To change the magnification from the reduced-size to the full-size copy, the pulleys 28, 29 are brought from their broken-line position back to their solid-line position. Thereupon, the second mirror supporting member 24 remains stationary at its broken-line position 24' while the first mirror supporting member 23 is displaced from its home position (solid line) to its broken-line position 23''. By this, the microswitch MS3 is closed. Thus, when the copy button CB is depressed with the aforementioned counter having been set to a desired number of copies, the relay RC is energized to close the switch RC2 and start the motor M while the relay R3 is also energized to close the switch R31. By the closing of the switch R31, the relay R1 is energized in spite of the microswitch MS1 being in opened position. The energized relay R1 closes the switch R11 and also closes the switch R12 at its contact F. This operates the clutch CLF for forward rotation so that the first and second mirrors 15 and 16 start moving forwardly toward their home positions. When the first mirror 15 arrives at its common home position and the second mirror arrives at its home position for the full-size copy, the first mirror supporting member 23 closes the microswitch MS4 to thereby turn on the lamp 18, as already noted. On the other hand, the microswitch MS1 is also closed but, since the relay R1 remains energized by the closing of the switch R11, the first and second mirrors 15 and 16 continue their forward movement toward the turn-back points while scanning the original. It will be noted that by the time when the first mirror supporting member 23 touches the microswitch MS1, the microswitch MS3 has already been opened and accordingly, the switch R31 has already been opened. Thereafter, the operations similar to those described above with respect to the full-size copy are repeated and when the first and second mirrors 15, 16 return to their home positions after having effected the predetermined number of reciprocations corresponding to the number of copies, the switch CS is opened to stop these mirrors 15 and 16. It has already been noted that the variable resistor VR is adjusted to regulate the number of revolutions of the motor M when the magnification is changed from the reduced-size to the full-size copy.

Figure 10:
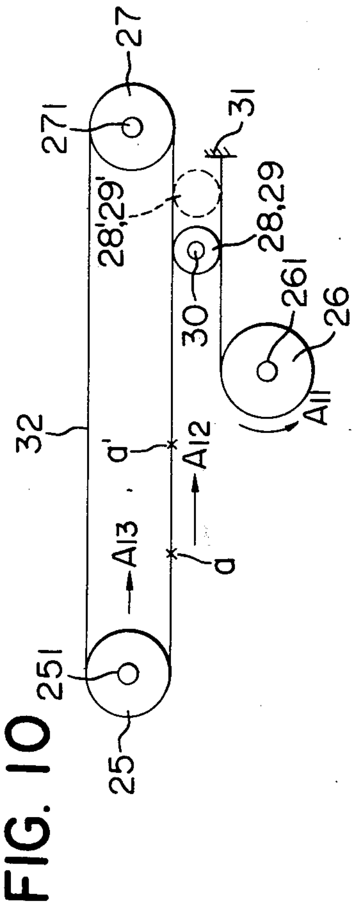
FIGS. 10 to 13 illustrate essential portions of further embodiments of the present invention.

In the embodiments hitherto described, the first mirror supporting member 23 is secured to the mirror forward driving wire 32 between the fixed pulley 27 and the movable pulley 25 provided to the second mirror supporting member 24, but as shown in FIG. 10, the first mirror supporting member 23 may be secured to the wire 32 at a point a between the second pulley 29 for copy magnification change operation and the movable pulley 25. In FIG. 10, the member 31 for substantially fixing the drive pulley 26 and the wire end secured to the apparatus body is positioned oppositely from that in the embodiment of FIG. 2. More particularly, the drive pulley 26 is disposed toward the movable pulley 25 on the second mirror supporting member with respect to the position of the integrally displaceable first and second pulleys 28, 29, and the wire end securing member 31 is disposed toward the fixed pulley 27. One end of the wire 32 is secured to the pulley 26 and this wire 32 is passed over the second pulley 29 for magnification change operation, the movable pulley 25, the fixed pulley 27 and the first pulley 28 for magnification change operation, in that order from the pulley 26. Of course, the first and second pulleys 28 and 29 for magnification change operation are disposed at a point more toward the fixed pulley 27 and the member 31 than the terminus of the forward stroke or the turn-back point of the securing point a of the wire 32 to the first mirror supporting member.

Figure 11:
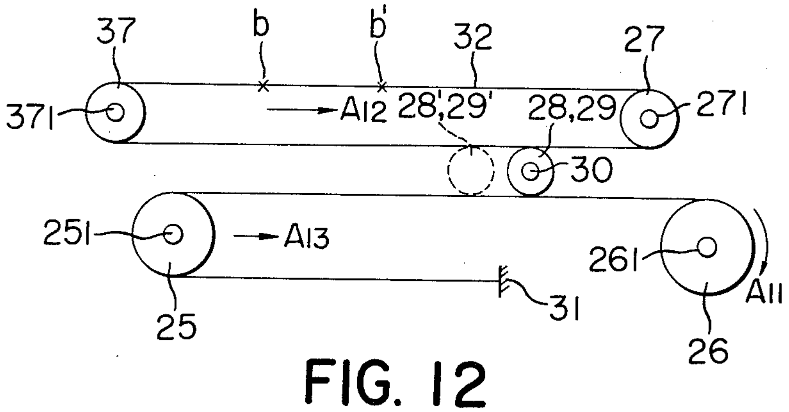

In FIG. 11, numeral 37 designates a fixed pulley rotatably supported on a shaft 371 provided in place within the apparatus. This pulley 37 is disposed on the opposite side from the pulley 27 with respect to the position of the integrally displaceable first and second pulleys 28 and 29 for magnification change operation. The first mirror supporting member is secured to the wire 32 at a point b between the pulleys 37 and 27. The wire 32 has one end thereof secured in place by the member 31 and is passed over the running pulley 25 on the second mirror supporting member, the first pulley 28 for magnification change operation, the fixed pulley 37, the fixed pulley 27 and the second pulley 29 for magnification change operation, in succession. The other end of the wire 32 is secured to the drive pulley 26. Of course, the pulleys 28 and 29 are disposed more toward the pulleys 27 and 26 than the terminus of the forward stroke or the turn-back point of the running pulley 25.

In the embodiments of FIGS. 10 and 11, as in the embodiment of FIG. 2, the wire 32 extends substantially parallel to the guide rail for the first and second mirror supporting members, between the adjacent pulleys with respect to the path defined by the wire and between the securing point of the wire end to the apparatus body and the adjacent pulley. The pulleys 26, 27 and 37 are rotatable in place within the apparatus. Over the first and second pulleys 28 and 29 for magnification change operation, the wire is passed substantially in the opposite directions. Again in the embodiments of FIGS. 10 and 11, the pulleys 28 and 29 are displaced in the directions of the wire passed thereover by the copy magnification change operation, as in the embodiment of FIG. 2. When the copy magnification is to be changed from the full-size to the reduced-size copy, the pulleys 28, 29 are displaced from their solid-line positions to their broken-line positions 28′,29′, without the pulley 26 being rotated. At this time, the points a and b are displaced to points a′ and b′, respectively. The amount of such displacement is one-half of that of the first mirror and during such displacement, the first and second pulleys 28 and 29 are rotated in the same direction, as in the embodiment of FIG. 2. In FIG. 10 or 11, when scanning the original, namely, when forwardly moving the first and second mirrors form the home positions, the drive pulley 26 is rotated in the direction of arrow $A_{11}$ at a velocity corresponding to the set copy magnification. With this, the securing point of the first mirror supporting member to the wire 32 is moved in the direction of arrow $A_{12}$ and the movable pulley 25 is moved in the direction of arrow $A_{13}$ which is the same as the direction of arrow $A_{12}$, and at one-half of the velocity of the aforementioned securing point. For the backward movement of the first and second mirrors, use may be made of the mechanism already explained in connection with FIG. 2 and so on, namely, the mechanism comprising reversing means for the fixed pulley 34, wire 35, drive pulley 33 and drive pulleys 26, 33. In the apparatus of FIG. 10, the pulleys 26, 29 and 25 are rotated during the forward and the backward movement of the first and second mirrors 15 and 16. During magnification change operation, the pulleys 28, 29, 25 and 27 are rotated. In the embodiment of FIG. 11, all pulleys are rotated during the forward and the backward movement of the first and second mirrors 15 and 16. During magnification change operation, the pulleys 28, 29, 27 and 37 are rotated. In both of the FIGS. 10 and 11 embodiments, displacement of the pulleys 28 and 29 can not take place without magnification change operation. Also, as will be apparent, in the embodiment of FIG. 11, the first and second pulleys 28, 29 for magnification change operation are rotated at the same time and in the same direction. Thus, in the embodiment of FIG. 11, if these pulleys 28 and 29 are in the same direction, they need not be designed for individual rotations but may be immovably secured relative to each other by bolts or like means. However, if these pulleys 28 and 29 differ in diameter, they should be designed for individual rotations. In the other embodiments also, the pulleys 28 and 29 may have different diameters.

Figure 12:
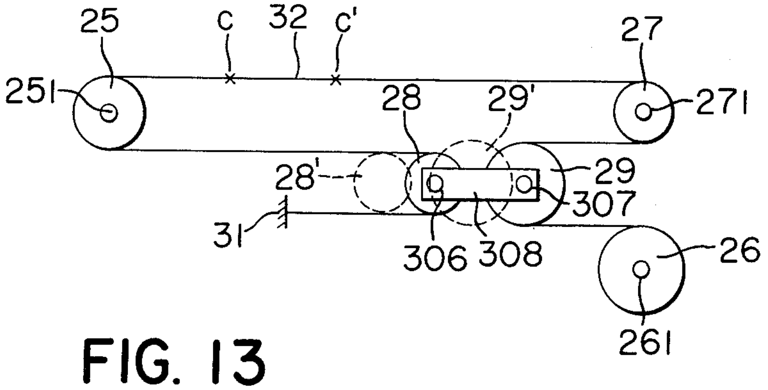

FIG. 12 shows an embodiment in which portions of the FIG. 2 embodiment are modified. As already noted, the movable pulley 25 is rotatably supported on the second mirror supporting member 24 and the first mirror supporting member 23 is secured to the wire 32 at a point c between the the pulleys 25 and 27. In the embodiment of FIG. 12, the diameter of the first pulley 28 for magnification change operation is smaller than that of the second pulley 29, or vice versa. In this embodiment, the pulleys 28 and 29 are rotatably supported on discrete shafts 306 and 307. However, these two shafts 306 and 307 are integrally supported by a single support means 308. When the magnification is to be changed from the full-size to the reduced-size copy, the support means 308 is displaced leftwardly from its shown solid-line position by one-half of the amount of displacement of the first mirror 15, thereby bringing the pulleys 28 and 29 to their broken-line positions 28′ and 29′, respectively. Thus, in the present embodiment, the pulleys 28 and 29 are not mounted coaxially and yet, they are displaceable in the same direction, over the same distance and at the same time, by magnification change operation. In other words, the pulleys 28 and 29 are integrally displaceable as in the other embodiments. The displacement of the pulleys 28 and 29 to their broken-line positions 28′ and 29′ accompanies the displacement of the point c to the position c′.

Figure 13:
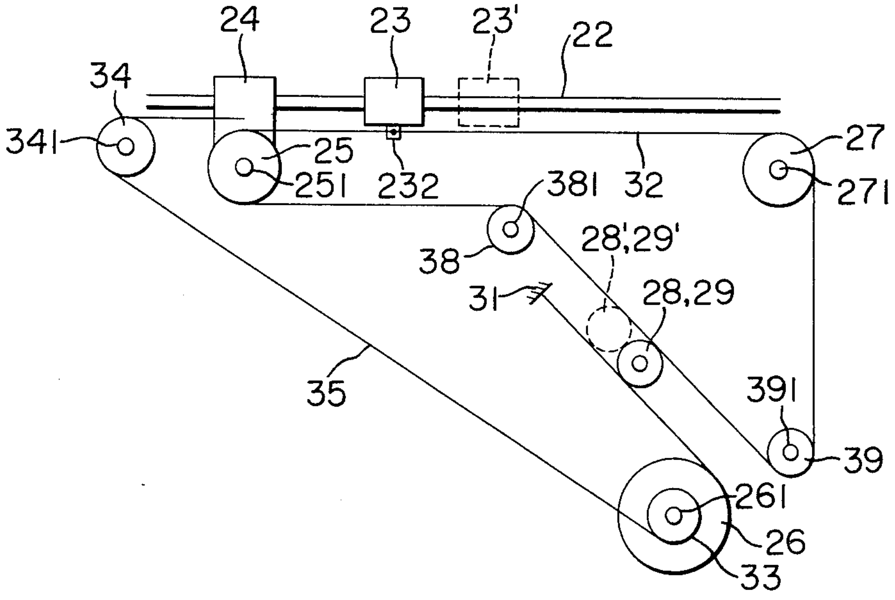

In the embodiments hitherto described, the wire 32 between adjacent pulleys extends parallel to the first and second mirror guide rail 22. This is preferable to make the mechanism compact, but an arrangement as shown in FIG. 13 may also be adopted. In FIG. 13, portions of the FIG. 2 embodiment are modified. Designated by 38 and 39 are fixed pulleys rotatably supported on shafts 381 and 391 mounted in place within the apparatus. Wire 32 is passed over a pulley 38 for deflection between the pulleys 25 and 28, and further passed over a pulley 39 for deflection between the pulley 27 and 29. Of course, the pulleys 38 is disposed more toward the pulley 27 than the terminus of the forward stroke of the pulley 25. The embodiment of FIG. 13 is similar to the embodiment of FIG. 2 with the exception that such pulleys 38 and 39 are so disposed as to provide portions of the wire 32 which are not parallel to the guide rail 22. In short, in any of the described embodiments, the wire 32 for forwardly driving the first and second mirrors extends substantially parallel to the guide rail 22 within at least the range of movement of the coupling point of the first mirror supporting member 23 to the wire. Also, that portion of the wire 32 which is engaged with the movable pulley 25, namely, which is stretched on the opposite sides of the movable pulley 25, extends substantially parallel to the guide rail 22 within at least the range of movement of the running pulley 25. The wire 32 is further passed over the first and second pulleys 28 and 29 integrally displaceable by magnification change operation, in a manner to be described. The wire 32 is passed over the first pulley 28 substantially in the opposite direction to the second pulley 29. These portions of the wire 32 which are stretched on the opposite sides of the pulley 28 are parallel to each other within at least the range of displacement of this pulley 28, and those portions of the wire 32 which are stretched on the opposite sides of the pulley 29 are parallel to each other within at least the range of displacement of this pulley 29. Thus, the wire portions stretched on the opposite sides of the pulleys 28 and 29 are all parallel. Such stretch of the wire 32 is desirable.

In the embodiments of FIGS. 10 to 13, the mechanism for displacing the pulleys 28 and 29 may be the one described in connection with FIG. 4, and the control of the movement of the first and second mirrors may be accomplished by the use of the means shown in FIGS. 5 and 6 or FIGS. 7 and 9. In the described embodiments, the first and second reflector means are each provided by a single mirror, whereas each of them may also be provided by a plurality of mirrors.

In the present specification, the wording "secured in place" or "rotated in place" means being secured to a predetermined position on a substantially immovable member or means such as beam, column or side wall within the copying apparatus or being rotated there without being substantially displaced to anywhere else. Also, the wording "substantially secured to the apparatus body" means being substantially undisplaceably secured to the above-mentioned immovable member within the apparatus body. Further, in the illustrated embodiments, two selectable copy magnifications are used, namely, the full-size copy and a reduced-size magnifiction, whereas three or more magnifications may be used. In such case, it will be apparent that the positions to which the pulleys 28, 29 are displaced may be three or more.

Furthermore, in the described embodiments, the velocity of the photosensitive medium is the same for all magnifications, but it is also possible to change the peripheral velocity of the photosensitive medium in compliance with a change in copy magnification and to make the velocity of forward movement of the first and second reflector means constant for all magnifications. In this case, if the peripheral velocity of the photosensitive medium for the full-size copy is v and the velocities of forward movement of the first and second reflector means are v and v/2, respectively, then the photosensitive medium may be moved at a peripheral velocity of mv for the copy magnification m.

Still further, in any of the described embodiments, the lens is also displaced with the first reflector means by magnification change operation, but alternatively the lens may be fixed at a predetermined position within the apparatus for any magnification. In this latter case, the third and fourth mirrors in FIG. 1, for example, may be displaced by magnification change operation so as to satisfy the above-mentioned formula. Accordingly, the amount of displacement of the first mirror for satisfying the above-mentioned formula becomes greater than in each of the illustrated embodiments.

What we claim is:

1. A variable magnification copying apparatus comprising:

an original carriage for supporting thereon an image original to be copied;
a movable photosensitive medium;
scanning means for optically scanning said original;
a lens for receiving the light from said scanning means and forming an optical image of said original on said photosensitive medium;
said scanning means including:
first reflector means optically opposed to said original carriage;
first support means for supporting said first reflector means;
second reflector means optically opposed to said first reflector means and said lens;
second support means for supporting said second reflector means;
guide means for supporting and guiding said first and second support means so as to be movable parallel to said original carriage;
a movable pulley rotatably supported on said second support means;
a rotatable member;
drive means for rotatively driving said rotatable member at least when said first and second reflector means are forwardly moved to optically scan said original;
a wire having one end substantially secured to the body of said apparatus and the other end secured to said rotatable member, said wire being passed over said movable pulley, and said first support means being secured to said wire between said movable pulley and said rotatable member with respect to the path defined by said wire;
first and second pulleys for changing the length of the optical path, which pulleys are integrally displaceable by a copy magnification change operation, said wire being passed over said first pulley between that end of said wire substantially secured to said apparatus body and the secured portion of said first support means with respect to the path defined by said wire, said wire also being passed over said second pulley between the secured portion of said first support means and that end of said wire secured to said rotatable member, said wire being passed over said first and said second pulleys substantially in the opposite directions; and
means for displacing said first and second pulleys to a position corresponding to a selected copy magnification and along the path defined by said wire with respect to said first and second pulleys, during a change of copy magnification.

2. An apparatus according to claim 1, wherein said wire is passed over said first pulley for changing the length of the optical path, between that end of said wire substantially secured to said apparatus body and said movable pulley supported by said second support means with respect to the path defined by said wire.

3. An apparatus according to claim 1, wherein said wire is passed over said first pulley for changing the length of the optical path, between said movable pulley supported by said second support means and the portion of said wire secured to said first support means with respect to the path defined by said wire.

4. An apparatus to claim 1, wherein said photosensitive medium is movable at the same velocity for any magnification and when said first and second reflector means are moved to optically scan said original, said drive means rotatively drives said rotatable member so that said rotatable member takes up said wire at a velocity equal to the velocity of said photosensitive medium substantially multiplied by the inverse number of the copy magnification.

5. An apparatus according to claim 1, wherein said first and second pulleys for changing the length of the optical path are substantially coaxial.

6. An apparatus according to claim 5, wherein said first and second pulleys are individually rotatably supported on a substantially common shaft.

7. An apparatus according to claim 1, wherein said first and second pulleys for changing the length of the optical path are supported by a common support means.

8. An apparatus according to claim 7, wherein said first and second pulleys are individually rotatably supported on said common support means.

9. A variable magnification copying apparatus comprising:

- an original carriage for supporting thereon an image original to be copied;
- a movable photosensitive medium;
- scanning means for optically scanning said original;
- a lens for receiving the light from said scanning means and forming an optical image of said original on said photosensitive medium;
- said scanning means including:
- first reflector means optically opposed to said original carriage;
- first support means for supporting said first reflector means;
- second reflector means optically opposed to said first reflector means and said lens;
- second support means for supporting said second reflector means;
- guide means for supporting and guiding said first and second support means so as to be movable parallel to said original carriage;
- a movable pulley rotatably supported on said second support means;
- a first rotatable member;
- first drive means for rotatively driving said first rotatable member at least when said first and second reflector means are forwardly moved to optically scan said original;
- a first wire having one end substantially secured to the body of said apparatus and the other end secured to said first rotatable member, said first wire being passed over said movable pulley, and said first support means being secured to said first wire between said movable pulley and said rotatable member with respect to the path defined by said wire;
- first and second pulleys for changing the length of the optical path, which pulleys are integrally displaceable by a copy magnification change operation, said first wire being passed over said first pulley between that end of said wire substantially secured to said apparatus body and the secured portion of said first support means with respect to the path defined by said wire, said first wire being also passed over said second pulley between the secured portion of said first support means and that end of said first wire secured to said first rotatable member, said first wire being passed over said first and said second pulleys substantially in the opposite directions;
- means for displacing said first and second pulleys to a position corresponding to a selected copy magnification and along the path defined by said first wire with respect to said first and second pulleys, during the change of copy magnification;
- a second rotatable member;
- second drive means for rotatively driving said second rotatable member at least when said first and second reflector means are backwardly moved to their home positions after having scanned said original; and
- a second wire having one end substantially secured to said second support means, at least said one end portion of said second wire being stretched over said second support means substantially in the opposite direction to the direction in which said first wire is stretched over said running pulley, the other end of said second wire being secured to said second rotatable member.

10. An apparatus according to claim 9, wherein said first wire is passed over said first pulley for changing the length of the optical path, between that end of said first wire substantially secured to said apparatus body and said movable pulley supported by said second support means with respect to the path defined by said first wire.

11. An apparatus according to claim 9, wherein said first wire is passed over said first pulley for changing the length of optical path, between said running pulley supported by said second support means and the portion of said first wire secured to said first support means, with respect to the path defined by said first wire.

12. An apparatus according to claim 9, wherein said photosensitive medium is movable at the same velocity for any magnification and when said first and second reflector means are moved to optically scan said original, said first drive means rotatively drives said first rotatable member so that said first rotatable member takes up said first wire at a velocity equal to the velocity of said photosensitive medium substantially multiplied by the inverse number of the copy magnification.

13. An apparatus according to claim 9, wherein said first and second pulleys for changing the length of the optical path are substantially coaxial.

14. An apparatus according to claim 13, wherein said first and second pulleys are individually rotatably supported on a substantially common shaft.

15. An apparatus according to claim 9, wherein said first and second pulleys for changing the length of the optical path are supported by a common support means.

16. An apparatus according to claim 15, wherein said first and second pulleys are individually rotatably supported on said common support means.

17. An apparatus according to claim 9, wherein said first and second drive means are identical and produce rotative drives in the opposite directions during the forward movement of said first and second reflector means for the scanning of said original and during the backward movement of said first and second reflector means to their home positions.

18. An apparatus according to claim 17, wherein said first rotatable member and second rotatable member are coaxial and rotatable in the same direction, the diameter of said second rotatable member is one-half of that of said first rotatable member, and said first wire is passed over said first rotatable member in the opposite direction to said second wire passed over said second rotatable member.

19. A variable magnification copying apparatus comprising:
an original carriage for supporting thereon an image original to be copied;
a movable photosensitive medium;
scanning means for optically scanning said original;
a lens for receiving the light from said scanning means and forming an optical image of said original on said photosensitive medium;
said scanning means including:
first reflector means optically opposed to said original carriage;
first support means for supporting said first reflector means;
second reflector means optically opposed to said first reflector means and said lens;
second support means for supporting said second reflector means;
guide means for supporting and guiding said first and second support means so as to be movable parallel to said original carriage;
a movable pulley rotatably supported on said second support means;
a rotatable member;
drive means for rotatively driving said rotatable member at least when said first and second reflector means are forwardly moved to optically scan said original;
a wire having one end substantially secured to the body of said apparatus and the other end secured to said rotatable member, said wire being passed over said movable pulley, said first support means being secured to said wire between said movable pulley and said rotatable member with respect to the path defined by said wire;
first and second pulleys for changing the length of optical path, which pulleys are integrally displaceable by a copy magnification change operation, said wire being passed over said first pulley between that end of said wire substantially secured to said apparatus body and the secured portion of said first support means with respect to the path defined by said wire, said wire being also passed over said second pulley between the secured portion of said first support means and that end of said wire secured to said rotatable member, said wire being passed over said first and said second pulleys substantially in the opposite directions;
means for displacing said first and second pulleys to a position corresponding to a selected copy magnification and along the path defined by said wire with respect to said first and second pulleys, during the change of copy magnification, said first reflector means being displaceable from its home position to a position corresponding to a selected magnification when said first and second pulleys are displaced by said pulley displacing means; and
means for moving said first reflector means through a distance up to its home position, with said first and second pulleys maintained at respective positions corresponding to the selected magnification, while moving said second reflector through half of said distance in the direction of movement of said first reflector means, prior to optically scanning said original, after said first reflector means has been displaced from its home position to said position corresponding to the selected magnification with said displacement of said first and second pulleys for changing the length of the optical path.

20. An apparatus according to claim 19, wherein said wire is passed over said first pulley for changing the length of the optical path, between that end of said wire substantially secured to said apparatus body and said movable pulley supported by said second support means with respect to the path defined by said wire.

21. An apparatus according to claim 19, wherein said wire is passed over said first pulley for changing the length of the optical path, between said movable pulley supported by said second support means and the portion of said wire secured to said first support means with respect to the path defined by said wire.

22. An apparatus according to claim 19, wherein said photosensitive medium is movable at the same velocity for any magnification and when said first and second reflector means are moved to optically scan said original, said drive means rotatively drives said rotatable member so that said rotatable member takes up said wire at a velocity equal to the velocity of said photosensitive medium substantially multiplied by the inverse number of the copy magnification.

23. An apparatus according to claim 19, wherein said first and second pulleys for changing the length of the optical path are substantially coaxial.

24. An apparatus according to claim 23, wherein said first and second pulleys are individually rotatably supported on a substantially common shaft.

25. An apparatus according to claim 19, wherein said first and second pulleys for changing the length of the optical path are supported by a common support means.

26. An apparatus according to claim 25, wherein said first and second pulleys are individually rotatably supported on said common support means.

27. A variable magnification copying apparatus comprising:
an original carriage for supporting thereon an image original to be copied;
scanning means for optically scanning said original;
a lens for receiving the light from said scanning means and forming an optical image of said original on photosensitive medium;
said scanning means including:
first reflector means optically opposed to said original carriage;
first support means for supporting said first reflector means;
second reflector means optically opposed to said first reflector means and said lens;
second support means for supporting said second reflector means;
guide means for supporting and guiding said first and second support means so as to be movable parallel to said original carriage;
movable pulley means rotatably supported on said second support means;
wire means having a portion substantially secured to said apparatus body and a portion substantially secured to said first support means, and being passed over said movable pulley between said two portions;
drawing means for drawing said wire means when said first and second reflector means are forwardly moved to optically scan said original, said wire means being substantially secured to said first support means between the portion passed over said movable pulley means and the portion connected to said drawing means;

first pulley means for changing the length of the optical path displaceable by a copy magnification change operation;

second pulley means for changing the length of the optical path displaceable by the copy magnification change operation, said wire means being passed over said first pulley means between the portion substantially secured to said apparatus body and the portion substantially secured to said first support means, said wire being also passed over said second pulley means between the portion substantially secured to said first support means and the portion connected to said drawing means;

means for simultaneously displacing, upon a magnification change, said first and second pulley means to respective positions corresponding to the selected copy magnification, wherein the amounts of displacement of said first and second pulley means are the same; and means for returning said first reflector means and said second reflector means to their respective home positions after termination of an original scanning operation.

28. An apparatus according to claim 27, further comprising, means for moving said first reflector means through a distance up to its home position, with said first and second pulleys maintained at respective positions corresponding to the selected magnification, while moving said second reflector through a half of said distance in the direction of movement of said first reflector means, prior to optically scanning said original, after said first reflector means has been displaced from its home position to said position corresponding to the selected magnification with said displacement of said first and second pulleys for changing the length of the optical path.

29. A variable magnification copying apparatus comprising:

an original carriage for supporting thereon an image original to be copied;

scanning means for optically scanning said original;

a lens for receiving the light from said scanning means and forming an optical image of said original on a photosensitive medium;

said scanning means including:

first reflector means optically opposed to said original carriage;

first support means for supporting said first reflector means;

second reflector means optically opposed to said first reflector means and said lens;

second support means for supporting said second reflector means;

guide means for supporting and guiding said first and second support means for movement parallel to said original carriage;

movable pulley means rotatably supported on said second support means;

wire means having a portion substantially secured to said apparatus body and a portion substantially secured to said apparatus body and a portion substantially secured to said first support means, and being passed over said movable pulley between said two portions;

drawing means for drawing said wire means when said first and second reflector means are forwardly moved to optically scan said original, said wire means being substantially secured to said first support means between the portion passed over said movable pulley means and the portion connected to said drawing means;

a first and a second pulley for changing the length of the optical path integrally displaceable by a copy magnification change operation, said wire means being passed over said first pulley means between the portion substantially secured to said apparatus body and the portion substantially secured to said first support means, said wire being also passed over said second pulley means between the portion substantially secured to said first support means and the portion connected to said drawing means, wherein said wire is passed over said first and said second pulley substantially in the opposite directions;

means for displacing said first and second pulleys to a position corresponding to a selected magnification and along the path defined by said wire with respect to said first and second pulleys, during a change of copy magnification; and means for returning said first reflector means and said second reflector means to their respective home positions.

30. An apparatus according to claim 29, further comprising, means for moving said first reflector means through a distance up to its home position, with said first and second pulleys maintained at respective positions corresponding to the selected magnification, while moving said second reflector through a half of said distance in the direction of movement of said first reflector means, prior to optically scanning said original, after said first reflector means has been displaced from its home position to said position corresponding to the selected magnification with said displacement of said first and second pulleys for changing the length of the optical path.

* * * * *

UNITED STATES PATENT OFFICE
CERTIFICATE OF CORRECTION

Patent No. 4,168,905 Dated September 25, 1979

Inventor(s) TADAYUKI KITAJIMA

It is certified that error appears in the above-identified patent and that said Letters Patent are hereby corrected as shown below:

Column 6, line 1, "(m+1)/f" should read --(m+1)f--;

Column 21, line 3, after "apparatus" insert --according--.

Signed and Sealed this

*Eleventh* Day of *March 1980*

[SEAL]

*Attest:*

SIDNEY A. DIAMOND

*Attesting Officer* *Commissioner of Patents and Trademarks*